US012781127B2

(12) United States Patent
Li

(10) Patent No.: US 12,781,127 B2
(45) **Date of Patent: *Nov. 3, 2026**

(54) SMART CELLULOSE MULCH

(71) Applicant: Purdue Research Foundation, West Lafayette, IN (US)

(72) Inventor: Tian Li, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/216,484

(22) Filed: May 22, 2025

(65) Prior Publication Data

US 2025/0382521 A1 Dec. 18, 2025

Related U.S. Application Data

(60) Provisional application No. 63/650,861, filed on May 22, 2024.

(51) Int. Cl.
*C09K 17/52* (2006.01)
*A01G 13/35* (2025.01)
(Continued)

(52) U.S. Cl.
CPC .............. *C09K 17/52* (2013.01); *A01G 13/35* (2025.01); *C09D 183/06* (2013.01); *C09K 2101/00* (2013.01)

(58) Field of Classification Search
CPC ..... A01G 13/35; C09K 17/52; C09K 2101/00
See application file for complete search history.

(56) References Cited

U.S. PATENT DOCUMENTS 3,810,328 A * 5/1974 Bryan, Jr. .............. A01G 13/32 428/512
3,938,280 A * 2/1976 Vandemark ............ A01G 13/32 47/9
(Continued)

FOREIGN PATENT DOCUMENTS

CN 106818334 A * 6/2017 ............. A01G 13/35
WO WO-2023195746 A1 * 10/2023 ............. A01G 13/35

OTHER PUBLICATIONS

Kasirajan S., Ngouajio M. "Polyethylene and biodegradable mulches for agricultural applications: a review." Agronomy for Sustainable Development 32, 501-529 (2012); published online Jan. 12, 2012.
(Continued)

*Primary Examiner* — Michael H Wang
(74) *Attorney, Agent, or Firm* — Purdue Research Foundation

(57) ABSTRACT

A mulch may include a hydrophilic cellulose layer and hydrophobic top layer formed on the cellulose layer. The cellulose layer and top layer together may form a wettability gradient which facilitates directional water transport from the hydrophobic top layer to the hydrophilic cellulose layer. A surface of the hydrophobic top layer is optically opaque and exhibits a solar reflectance of 85% to 98% in response to incident light the 250-2500 nm wavelength range. The mulch provides a mid-infrared emissivity of 0.85 to 0.97 in the 8-13 μm range. The solar reflectance and mid-infrared emissivity decrease underlying soil temperature by at least 2° C. compared to uncovered soil under equivalent solar conditions.

21 Claims, 9 Drawing Sheets

(51) Int. Cl.
*C09D 183/06* (2006.01)
*C09K 101/00* (2006.01)

(56) References Cited

U.S. PATENT DOCUMENTS

| | | | | |
|---|---|---|---|---|
| 3,939,606 | A * | 2/1976 | Vandemark | A01G 13/32 47/9 |
| 6,294,265 | B1 * | 9/2001 | Loelovich | D04H 1/64 162/135 |
| 6,312,826 | B1 * | 11/2001 | Shogren | C09D 167/08 523/124 |
| 6,339,898 | B1 * | 1/2002 | Toye | A01G 13/32 47/9 |
| 2007/0180763 | A1 * | 8/2007 | Lougheed | A01G 13/35 47/9 |
| 2011/0104465 | A1 * | 5/2011 | Bilodeau | A01G 13/32 428/219 |
| 2018/0244928 | A1 * | 8/2018 | Van Overmeere | C09D 5/004 |
| 2018/0346813 | A1 * | 12/2018 | Backfolk | C09K 17/50 |
| 2018/0355248 | A1 * | 12/2018 | Backfolk | C05G 3/80 |
| 2020/0140757 | A1 * | 5/2020 | Chatterjee | C08B 1/02 |
| 2020/0154649 | A1 * | 5/2020 | Pande | D21H 21/32 |
| 2025/0361690 | A1 * | 11/2025 | Li | E02D 3/005 |

OTHER PUBLICATIONS

Pinpru N. et al. “Synthesis and preparation of bacterial cellulose/calcium hydrogen phosphate composite film for mulching film application.” Materials Today: Proceedings 47, 3529-3536 (2021).

Tian Y. et al. “Superhydrophobic and recyclable cellulose-fiber-based composites for high-efficiency passive radiative cooling.” ACS Applied Materials & Interfaces 13, 22521-22530 (2021); published May 5, 2021.

Li T. et al. “A radiative cooling structural material.” Science 364(6442), 760-763 (2019); May 24, 2019.

Zhang Y. et al. “Atmospheric Water Harvesting by Large-Scale Radiative Cooling Cellulose-Based Fabric.” Nano Letters 2626 2618 (2022); published Apr. 2, 2022.

Zhu W. et al. “Radiative cooling sorbent towards all-weather ambient water harvesting.” Communications Engineering 2, Article 35 (2023); published online Jun. 9, 2023.

Yang H.C. et al. “Janus membranes: creating asymmetry for energy efficiency.” Advanced Materials 30(43), 1801495 (2018); published online Jul. 20, 2018.

Tian X., et al. “Anisotropic liquid penetration arising from a cross-sectional wettability gradient.” Soft Matter 8(9), 2633-2637 (2012).

Shi W. et al. “Sorbents for Atmospheric Water Harvesting: From Design Principles to Applications.” Angewandte Chemie International Edition 61(43), e202211267 (2022); first published Aug. 12, 2022.

Jones M. et al. “Engineered mycelium composite construction materials from fungal biorefineries: A critical review.” Materials & Design 187, 108397 (2020); available online Dec. 2, 2019.

Sun W. et al. “Functionality of surface mycelium interfaces in wood bonding.” ACS Applied Materials & Interfaces 12 (51), 57431-57440 (2020); published Dec. 11, 2020.

Sydor M. et al. “Mycelium-based composites in art, architecture, and interior design: a review.” Polymers 14(1), 145 (2022); published Dec. 31, 2021.

* cited by examiner

SMART CELLULOSE MULCH

CROSS REFERENCE TO RELATED APPLICATIONS

This application claims the benefit of priority to U.S. Provisional Patent Application No. 63/650,861, filed on May 22, 2024, the entire contents of which are incorporated herein by reference.

TECHNICAL FIELD

This disclosure relates to green technology and, in particular, to mulch.

BACKGROUND

The increasing prevalence of extreme heatwaves and water scarcity represents a multifaceted hazard. Notably, highlighted by NBC, a record-breaking heatwave, with temperatures reaching approximately 46° C. alongside severe drought affecting farmland across the Sun Belt and Midwest. This exacerbates challenges to crop yield and squeezes out any remaining wiggle room to cope with anticipated ever-worse weather. It indicates that every 1° C. rise in global temperatures is projected to trigger an average crop yield reduction of 7.4% for corn, 6.0% for wheat, and 3.2% for rice. Apart from extreme heatwaves, agriculture is both a victim and a cause of water scarcity, i.e., it accounts for 70% to 95% of freshwater withdrawals and its thirst for more water will only be expected to escalate in correlation with global population growth. Moreover, the current agricultural irrigation relies on complex infrastructures, including pumps and pipes that extract water from rivers, lakes, and underground sources, which has been restricted by the high energy consumption of pumping, labor intensity, and substantial maintenance costs of equipment. Therefore, there is a pressing need to innovate methods that conserve natural water resources and alleviate heat stress for enhanced agriculture yields.

Intriguingly, atmospheric water, i.e., moisture in the air, constitutes ~10% of the global water reserve. It is ubiquitous, accessible to everyone, and cannot be depleted due to the global water cycle with continuous movement within the Earth and atmosphere by evaporation, condensation, and precipitation. Impressively, about 8 times more water cycles in the atmosphere than in all rivers combined. Moreover, global warming exacerbates water evaporation and warmer air can hold more moisture as the increased saturated vapor pressure. This increased water vapor, however, enhances the greenhouse effect by absorbing more heat emitted from the Earth, which prevents the heat from escaping into outer space. It warms the atmosphere further and fosters a self-reinforcing cycle of increased water evaporation and atmospheric warming. Therefore, water and heat issues are two correlated sectors, where harvesting the atmospheric water for agricultural irrigation can synchronously reduce atmospheric moisture levels to mitigate the greenhouse effect and alleviate the pressing agricultural water demand. Furthermore, the atmospheric transparent window over wavelengths from 8 to 13 μm provides us with a channel to dump heat into outer space, a huge cold reservoir with a temperature of ~3 K via radiative cooling.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
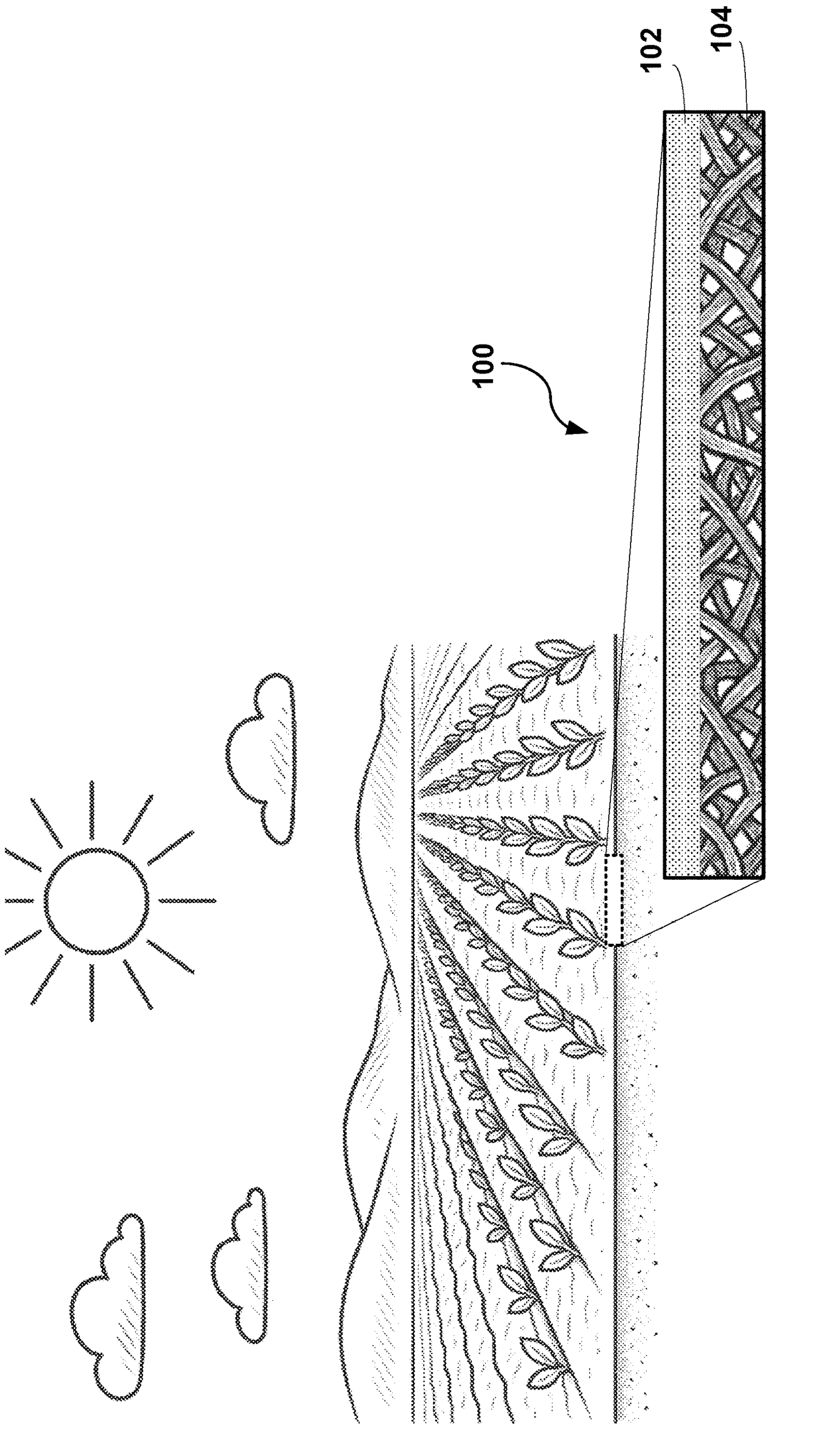
FIG. 1 illustrates an example of a mulch.

Global challenges in freshwater scarcity and food security are increasingly impacting billions worldwide. Agricultural practices, responsible for approximately 70-95% of global freshwater withdrawals, are anticipated to escalate with burgeoning populations. Seasonal variability in precipitation necessitates reliance on artificial irrigation which depends on accessible water sources and energy-intensive water treatment processes. Limited access to clean water constrains agricultural activities and crop diversity in off grid areas.

Mulching, a traditional agriculture practice for soil moisture retention and weed control, has been employed for decades to mitigate water runoff/evaporation and thereby alleviating the irrigation stress of farming activity. Nevertheless, the widely used plastic mulches faces notable environmental challenges of microplastic pollution, labor-intensive removal, and intricate recycling process. Sustainable alternatives like biodegradable synthetic mulches and organic variants (e.g., bark clippings), while offering nutrient enrichment and faster decomposition, demonstrate limited efficacy in moisture control and irrigation management of either being impermeable or allowing free mass exchange across soil-air interface.

The mulch, and related methods described herein, provide a multifunctional cellulose mulch that transcends traditional options by integrating atmospheric water harvesting (AWH), unidirectional water transport, passive radiative cooling, and enhanced photosynthesis effects.

In one example, a cellulose fabric is receives a hydrophobic layer on one side featuring tunable open holes, while retaining the hydrophilic cellulose on the other side, creates asymmetric wettability that facilitates unidirectional water flow. This design efficiently directs water from irrigation, climate precipitation, or collected ambient water to the dry soil via the surface energy gradient and capillary force, simultaneously reducing water runoff and maintaining soil moisture. The sorption capacity of hydrophilic part of cellulose mulch provides additional water storage, absorbing excess post-rainfall and releasing it if soil moisture reduces.

The multiscale porous cellulose network, with fiber diameters ranging from sub-micron up to 20 μm, effectively backscatters visible and near-infrared light, enhancing solar reflection. The passive cooling effect reduces temperatures in the root zone during dry and hot seasons/climates. It also enhances condensation and the absorption of moisture from the surrounding air. The reflected sunlight further enhanced overall photosynthesis efficiency at low canopy of crops and ensures the light reaches into typically shaded areas.

Thirdly, the millimeter long, entangled fibers with >1000 aspect ratio of our cellulose mulch provides robust mechanical strength for easy deployment and retrieval using standard mulching tractors. Its design for scalability and industry compatibility can facilitate a swift transition from technology to market.

Furthermore, cellulose mulch can sustainably be derived from agricultural and forestry products and waste, including materials such as bamboo, cotton, hemp, jute, corn stalks, grasses, and other lignocellulosic sources, representing a low life-cycle carbon footprint compared to traditional soil management and fertilization methods. As cellulose mulch breaks down, it enriches the soil with organic matter and improves soil structure and nutrient availability for plants.

FIG. 1 illustrates an example of a mulch 100. The mulch may include a cellulose layer 102 and a hydrophobic top layer 104. The mulch may exhibit a wettability gradient from a hydrophobic top surface of the hydrophobic layer to a hydrophilic bottom surface of the cellulose-based layer.

The cellulose layer and hydrophobic top layer together form a wettability gradient which facilitates directional water transport from the hydrophobic top layer to the hydrophilic cellulose layer. Accordingly, the mulch may facilitate directional water transport from the hydrophobic top surface to the hydrophilic bottom surface. The directional water transport may suppress water loss by minimizing evaporation and enhances infiltration into the soil. The hydrophobic top layer may provide a porous surface that is air-permeable and permits water vapor diffusion.

A surface of the top layer may optically opaque, exhibits a solar reflectance of 85% to 98% in response to incident light the 250-2500 nm wavelength range. Furthermore, the mulch provides a mid-infrared emissivity of 0.85 to 0.97 in the 8-13 μm range. The solar reflectance and mid-infrared emissivity may decrease underlying soil temperature by at least 2° C. compared to uncovered soil under equivalent solar conditions.

The hydrophobic layer may include, according to various examples, a physical coating or a biological material grown on the fabric.

Physical Coating.

By way of example, the hydrophobic coating may include polydimethylsiloxane (PDMS), silica ($SiO_2$), waxes, and/or alkylsilane compounds. PDMS exhibit excellent hydrophobicity while the low viscosity allows to partially encapsulate cellulose fibers on the coated surface during thermal curing, without affecting the hydrophilicity of the other side. From the molecular level, the air-drying activates the catalyst in the curing agent, promoting the formation of siloxane (Si—O—Si) bonds between PDMS chains. a condensation reaction where two hydroxyl groups (OH) from adjacent polymer chains react, forming a bond with the elimination of water or a similar byproduct molecule. From the micro level, the quick air-drying can facilitate uneven expansion and evaporation, resulting in released by-products (like volatile organic compounds) during curing and warping and deformations of PDMS and cellulose, further form the bubbles or voids in this composite.

The cellulose mulch with a PDMS coating may produced, for example, via a scalable roll-to-roll manufacturing process that starts with bamboo fiber extruded through spinnerets, utilizes slot-die coating to deposit a hydrophobic polydimethylsiloxane (PDMS) layer on the bamboo fiber, and leaves natural hydrophobic fiber on the other side.

In various experimentation, a diameter of 10 μm fiber bundles coated with a ~0.5 μm hydrophobic layer and the tailored with 100 μm diameter open hole and hydrophobic closed hole. The PDMS deposition rate may be set too to 5 mL $m^{-1}$ and thermally curing may occur at 150° C. for 10 min such that the coating fully encapsulates individual fibers/fiber bundles and leaves tailored open holes on the top surface. The manufacturing processes can be efficiently scaled up to produce continuous cellulose mulch of standard dimensions of 4-feet (1.22 m) width, at a remarkably low manufacturing cost, potentially as low as $3.19 per $m^2$.

The hole size may be tailored to provide a balance between repulsion forces and air permeability and aim to enhance the rate of water transport from the ambient to the soil, simultaneously ensuring that air permeability is preserved for root respiration. In various experimentation, a hole size of ~100 μm was found to accomplish this objective. In other examples, the hole size may range between 1 μm to 1 mm to increase airflow rate, effectively mitigating repulsive forces. This arrangement boosts the speed of water transport, without compromising on the air permeability crucial for healthy root function.

Unidirectional Water Transport

Figure 2:
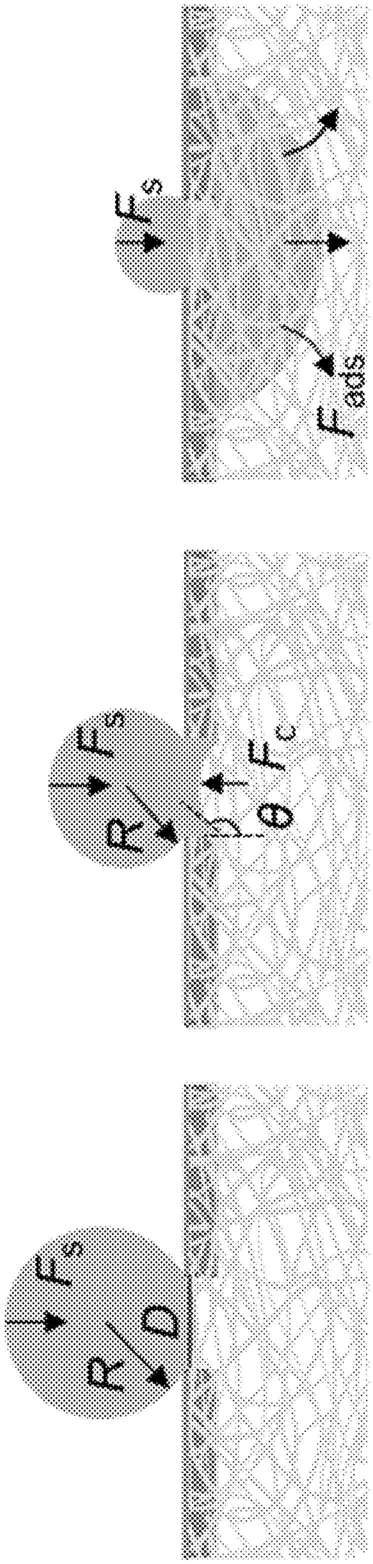
FIG. 2 illustrates an example how a wettability gradient providing unidirectional water transport reducing runoff from soil.

FIG. 2 illustrates an example how a wettability gradient providing unidirectional water transport reducing runoff from soil. The developed asymmetric wettability (150.8° water contact angle) enables unidirectional water transport to the soil. Qualitatively, from hydrophobic to hydrophilic surfaces, water experiences negative Gibb's free energy indicating a thermodynamically favorable process. For example, when a ~5 μL water droplet permeates through cellulose into the soil, it initially penetrates a hydrophobic layer slowly and steadily. This is followed by a sudden acceleration of the droplet as it transitions from the hydrophobic to a hydrophilic layer, exemplifying the directional water transport from air to the soil. Whereas the positive Gibb's free energy impedes the spontaneous water transport from hydrophilic to hydrophobic surface. The water critical pressure reveals that the threshold of water transport from the hydrophobic to the hydrophilic side in the cellulose mulch is significantly lower, about an order of magnitude less, validating the efficient air-to-soil flow while concurrently obstructing the reverse direction.

An analytical model of force balance analysis at the tri-phase interface during water intrusion is established to quantify the water transport kinetics across the asymmetrically wetted porous media. Initially, as the hydrophobic fibers contact incoming water, the low surface energy tends to repel the water in all directions resulting in a characteristic high droplet profile. Gravitational forces enable the water to gradually overcome this initial impedance and penetrate the hydrophobic fiber layers.

Once the tri-phase interface reaches the hydrophilic fiber networks, the water body experiences a combined capillary effect of hydrophobic repulsion and hydrophilic attraction. At this stage, the liquid water is actively drawn into the cellulose mulch, shown as a notable flip of the sign from upward to downward dragging force of 1-4 N. After the water fully wets the local pore space, the adsorption force from the wicking within the hydrophilic porous media then replace the capillary force to drive the overall kinetic. The adsorption force gradually ramps as the wicking continues and accelerates the kinetic of water transport.

Large pore size drastically reduces the initial impedance of water transport, but it may also increase vapor permeability that compromise the water retention of the mulch. Therefore, the hydrophobic coating with openings of 50 to 150-μm mean diameter to efficiently overcome intrusion forces while preserving little vapor permeability that is crucial for root respiration.

Soil Moisture Regulation

In addition to the unidirectional water transport reducing runoff from soil, the underlying principle of the cellulose mulch design also leverages the intrinsic ability of cellulose to harvest and store water.

Figure 3:
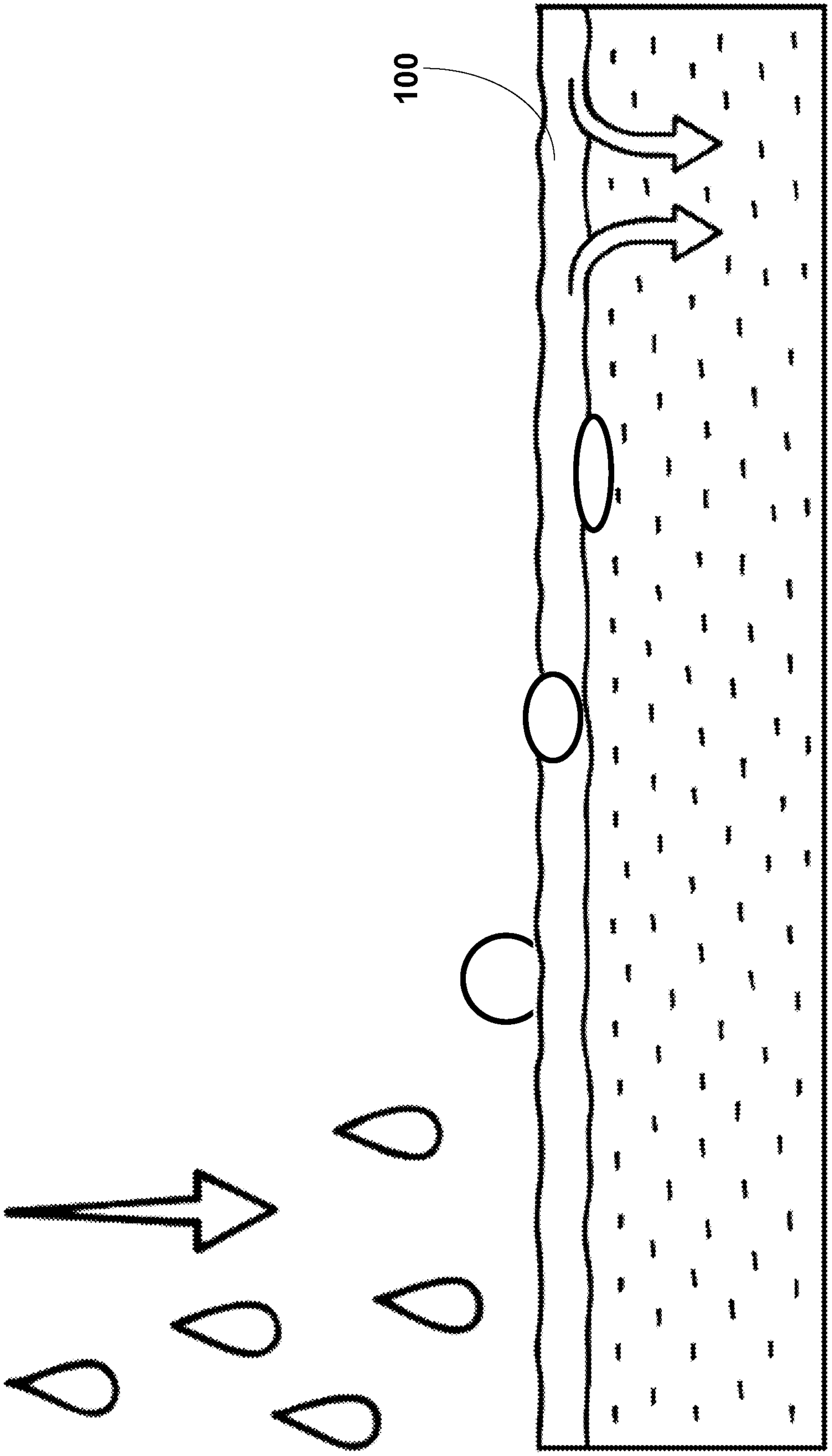
FIG. 3 illustrates an example of automatic water harvesting (AWS) provided by a mulch.

FIG. 3 illustrates an example of automatic water harvesting (AWS) provided by the mulch. AWH serves as an additive strategy to actively irrigate crops for its geographically independent water collection. The cooled hydrophilic cellulose mulch exhibits enhanced water vapor sorption and potentially induces condensation from ambient under humid environment. Under ambient temperature ($T_a$) of 15° C., the cellulose mulch can potentially harvest 0.01-1.59 Liter water per square meter via 6° C. passive cooling. The modeling results align with experimental data for the cellulose mulch validating the effectiveness of multiscale model. The contribution of condensation is significantly high at RH>~65%, due to passive cooling effects of the cellulose, and the high moisture transport rates between the mulch and adjacent air. These results, together with the observed increase compared to sorption isotherm as the baseline, underscore the potential of cellulose-based mulch to collect ambient water for irrigation.

To validate the synergistic multifunctionality, field tests with Tokyo Bekana cabbages showed that cellulose mulch retained soil moisture more effectively than white plastic mulch and bare soil, especially under direct sunlight. On September $2^{nd}$ and $3^{rd}$ evenings, both cellulose mulch and bare soil absorbed atmospheric moisture, as evidenced by increased water content (FIG. 3D). However, bare soil had evaporation rates up to 80% higher than those of cellulose mulch, resulting in significant loss of crop roots.

In contrast, cellulose mulch not only preserved more water but also maintained more consistent moisture levels between watering sessions compared to bare soil.

Meanwhile, the enhanced vapor permeance exhibited by the cellulose mulch suggests superior $CO_2$ and $O_2$ exchange compared to plastic mulch, indicating improved breathability and healthier root zone conditions.

With the unidirectional transport and AWH features, we estimated the global irrigation water saving potentials of cellulose mulch based on its water harvesting capacity and the yearly RH distribution. For instance, in North America, farmers could potentially save approximately 1500 L $m^{-2}$, with a maximum of 3500 L $m^{-2}$ in Texas region.

Self-Cooled Cellulose Mulch

Figure 4A:
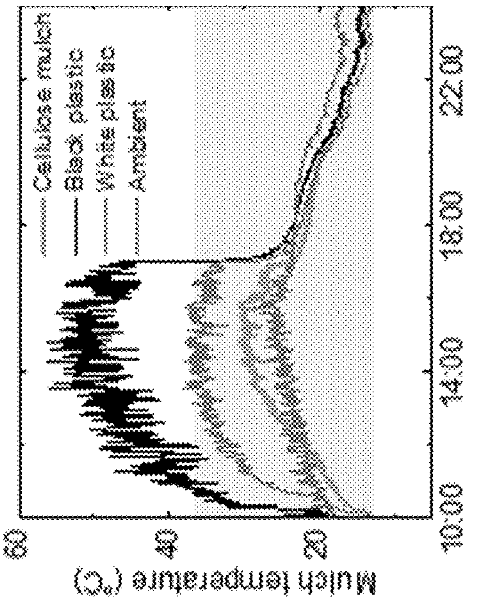
FIG. 4A-D illustrates an example of experimental results for a mulch having a hydrophobic coating.
Figure 4B:
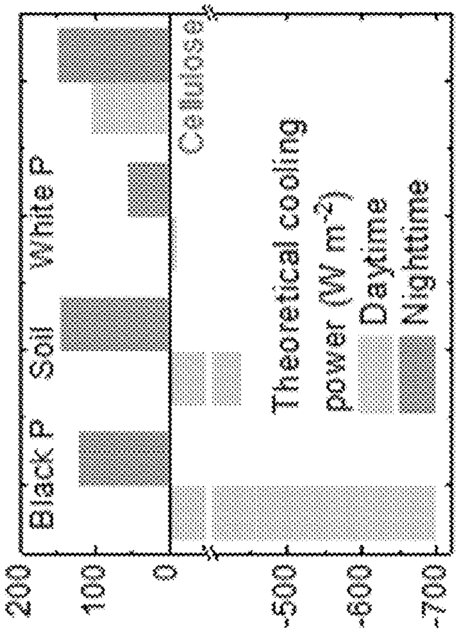

FIG. 4A-B illustrates an example of experimental results for the mulch having the hydrophobic coating described herein. During the growing season at Purdue Student Farm, from early April to late October, the average ambient temperature surpasses 20° C. for 114 days and high temperatures peak over 32° C. for 21 days. The persistent high temperature elevates the root-zone temperatures, leading to stress on irrigation systems and plant growth. For example, it was observed the blossom end rot in tomatoes and premature blooming in cabbages due to reduced soil moisture and high ambient temperature respectively, adversely affecting crop yield and quality.

Referring to FIG. 4A, conventional plastic mulch can lessen the need for irrigation but unavoidably increases the soil solarization due to high solar absorption or transmission as shown by the largely positive thermal gain. In contrast, the highly reflective cellulose mulch effectively rejects thermal energy of 103.5 W $m^{-2}$, even at a solar intensity of 900 W $m^{-2}$.

The top PDMS layer enhances thermal emission due to the C—H bonding at 792 $cm^{-1}$ in its hydrophobic functional groups, coupled with the abundant O—H bending and C—O stretching in cellulose molecules, further reducing evaporation rate, and aiding in conserving irrigation water.

Regarding the mulch temperatures, the cellulose mulch demonstrated enhanced temperature stability, with a maximum temperature that was 26.6° C. lower than black plastic mulch and 11.0° C. lower than white plastic mulch under peak solar conditions (FIG. 4B).

Figure 4C:
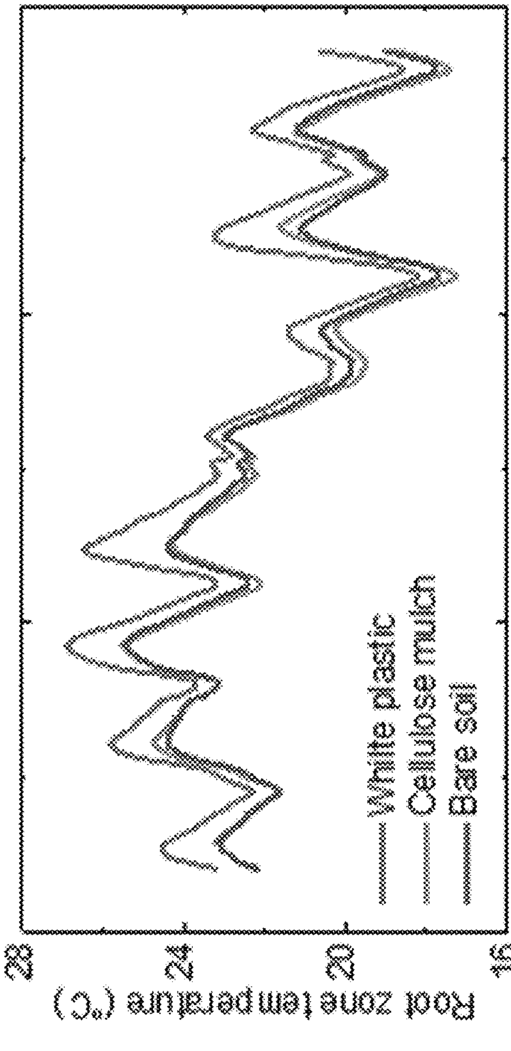

A further soil (root zone) temperature comparison under cellulose and white plastic mulch with Tokyo Bekana cabbages validated consistently lower soil temperature under the cellulose mulch (FIG. 4C).

The temperature of the bare soil remained comparable to that under the cellulose mulch, due to evaporative cooling, however, at the expense of soil moisture reduction.

Therefore, cellulose mulch is favorable for crop survival and growth in the hot seasons for it minimizes thermal gain and root zone temperature without depleting soil moisture.

The high solar reflectivity of cellulose mulch not only moderates soil temperatures but enhances photosynthesis efficiency by reflecting more photons to the chloroplasts on the backside of crops' leaves.

According to a 2D ray optics model of common crops separated by 0.9 m (36 inches), crops can receive 44% and 17% higher solar energy deposition than bare soil and white plastic mulch respectively, regardless of the incident angles).

Furthermore, photosynthesis enhancement starts to shapely decrease as the trench width reduces below 0.6 m, which means the merits of highly reflective cellulose mulch is most pronounced when the crops are planted in commonly growth interval of 0.7-0.9 m (30-36 inches).

To evaluate the impact of cellulose mulch on photosynthesis of real plants, we transplanted 24 Jet Star variety tomato plants into a raised bed, with 12 of them being covered by cellulose mulch.

Figure 4D:
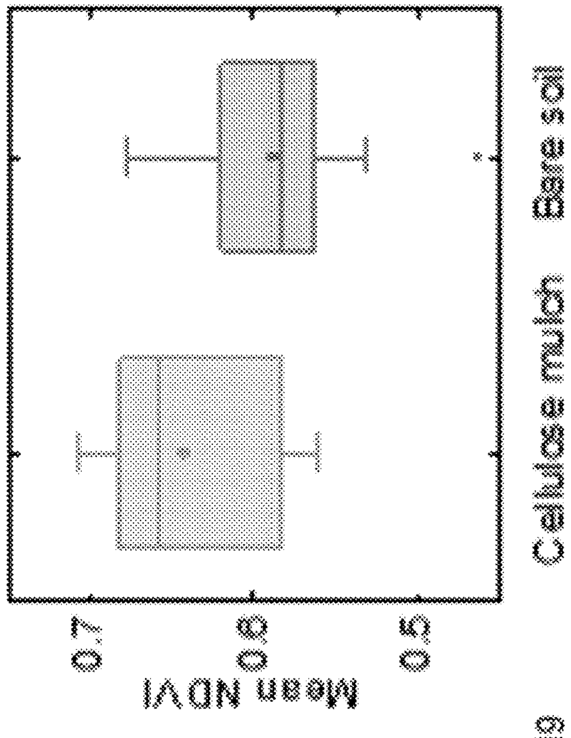

Referring to FIG. 4D, after 61 days, 15 leaves randomly selected from the lower canopy of the cellulose mulch covered plants exhibited a significantly higher Normalized Difference Vegetation Index (NDVI) compared to those grown in bare soil with $p<0.05$.

The higher NDVI, indicating healthier and greener leaves attributed to increased solar exposure from the cellulose mulch, corresponded with enhanced photosynthesis (FIG. 4H).

Furthermore, the low sunlight transmission of cellulose mulch (27.3%) effectively suppresses weed germination compared to the 51.1% solar transmission of white plastic mulch, as evidenced in a study with Tokyo Bekana cabbages where cellulose mulch significantly reduced weed density relative to both white plastic mulch and bare soil conditions.

The integrated impact of optical and thermal management on crop growth, photosynthesis, and weed suppression highlights the versatility and comprehensive functionality of our cellulose mulch system.

Hydrophobic Biological Layer

Figure 5:
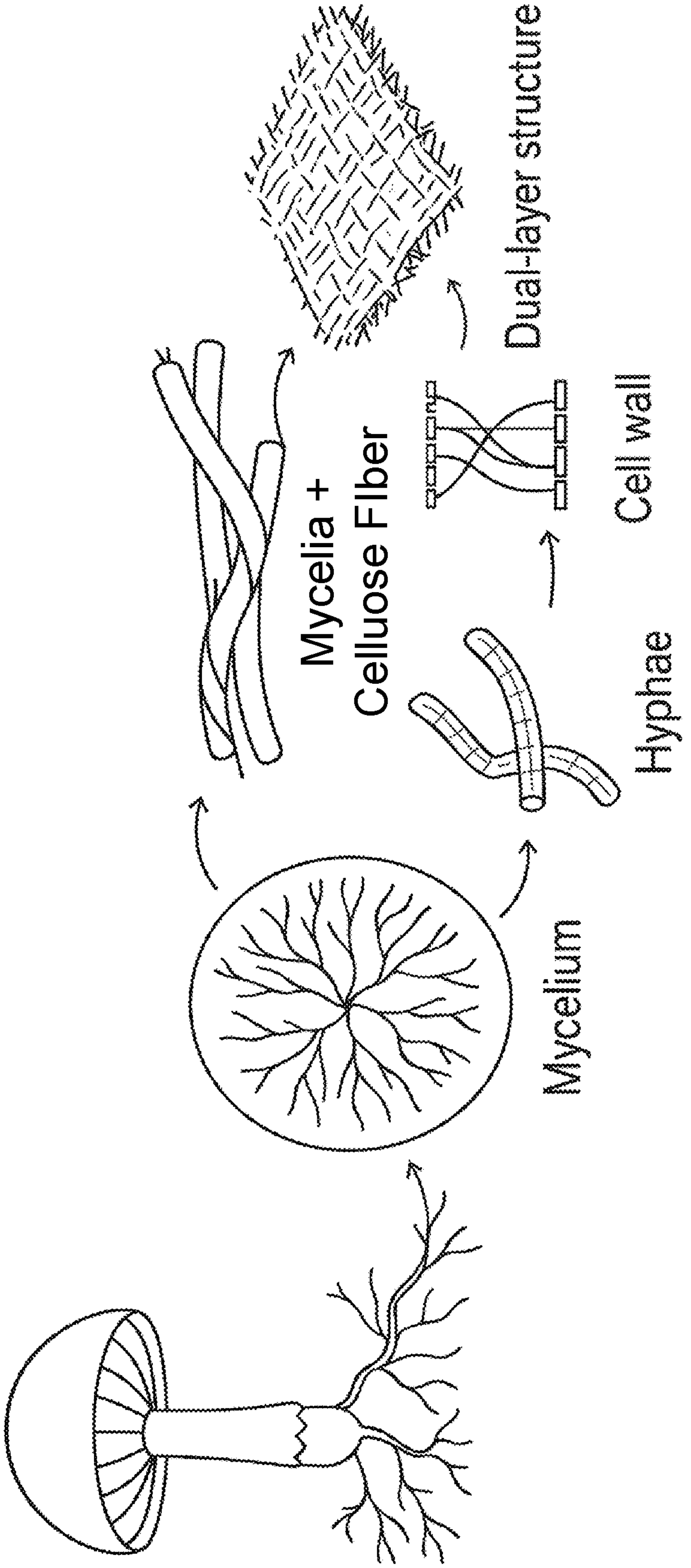
FIG. 5 illustrates an example of forming a dual layer structure using a mycelium network.

FIG. 5 illustrates an example of forming a dual layer structure using a mycelium network. Living organisms have historically been harnessed to synthesize materials for engineering needs, including silk, cellulose, and wood, facilitating the exploitation of functional materials with unique properties. To date, fungal mycelium stands out due to its nature as a living, complex, and adaptive system with emergent collective properties, such as insulation boards, packaging materials, and leather.

Mycelium, the vegetative part of fungi, includes an extensive network of interconnected white hyphae. The hyphae locally absorb water and nutrients, facilitating mycelial exploration and colonization of the surroundings. Given adequate nutrition, the mycelium will exponentially thrive, reproduce, and self-assemble into a continuous film. The biomanufacturing process may involve the cultivation of mycelium on a cellulose fabric substrate, where mycelium fibers are physically entwined with cellulose fibers. Meanwhile, down to the molecular level, the formation of interfacial hydrogen bonds between mycelium and cellulose fibers significantly enhances their mutual adhesion for mechanical strength. Mycelium fiber networks, evolving atop the cellulose fabrics, exhibit intricate micro- and nano-scale porous structures, coupled with hydrophobin on the surface of single mycelium fibers, which collectively endows the mycelium with superhydrophobic features. Feature with a superhydrophobic mycelium fiber network on the top and hydrophilic cellulose fabrics at the bottom, this living biomulch shows a Janus wettability and facilitates the directional water transport from the atmosphere to the soil. Moreover, the white mycelium, characterized by a hierarchical porous structure, exhibits an excellent sunlight backscattering effect attributed to randomly dispersed micro- and nano-scaled fibers. This is exemplified by increasing the bare soil albedo from 20% to 92%, which rejects ~70% more solar irradiance. At the same time, strong molecular vibrations of chemical bonds in mycelium and cellulose induce a high thermal emittance and promote heat dissipation via radiative cooling. The radiative cooling potential of the living biomulch during the nighttime can even reduce its surface temperature below the dew point, resulting in efficient water condensation for passive irrigation. These unique optical functionalities mitigate soil heat stress via enhanced solar rejection and thermal dissipation. The diffused reflective surface of the living biomulch can also re-direct sunlight toward the low canopy of corps for enhanced photosynthesis and crop yield. These features make mycelium a fascinating and adaptive tool that self-organizes into hierarchical structures with Janus wettability for directional water transport for combating water scarcity and spectral selectivity for tackling extreme heatwaves. It is worth noticing that the biodegradability of the living biomulch eliminates the necessity for post-season cleanup and disposal, thereby minimizing the risk of plastic contamination that is inherent to traditional plastic mulches. Taking advantage of the unique features of the mycelium network, we provide a biomanufacturing strategy that can engineer mycelium and cellulose composites for living biomulch toward sustainable agriculture.

In various experimentation, a thin layer of agar hydrogel was coated on a Petri dish as the cultivation base of mycelium hyphae. Starting from a sterilized cellulose fabric as the scaffold, three drops of nutrition liquid on the cellulose fabric for the cultivation of fungus broth containing blue oyster mushrooms. After two-day growth, sparse, white, and thread-like hyphae begin to spread across the cellulose surface. As time goes on, the hyphae multiply and thicken, spreading over a larger area with dense and white mycelial structures after 4 days. After being fully colonized for 6 days, the bottom cellulose fabric was densely covered by a thick and white mycelium, forming a network of mycelium hyphae, and resembling a fluffy structure. The white mycelium network growing on top of the cellulose fabric can efficiently backscatter sunlight to diminish solar heating.

Figure 6B:
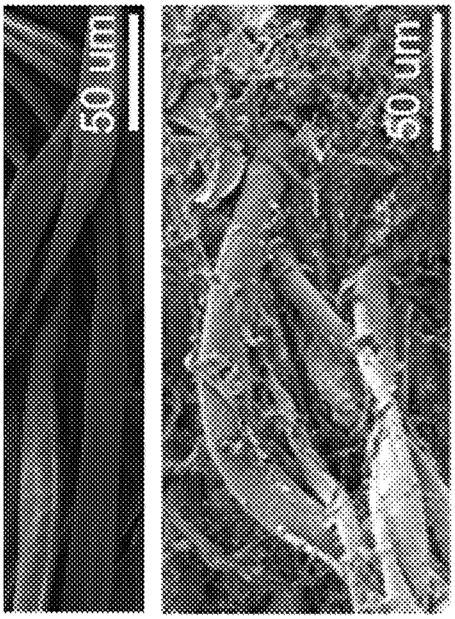
FIG. 6A-C illustrate an example of images of a mycelium mesh network.
Figure 6A:
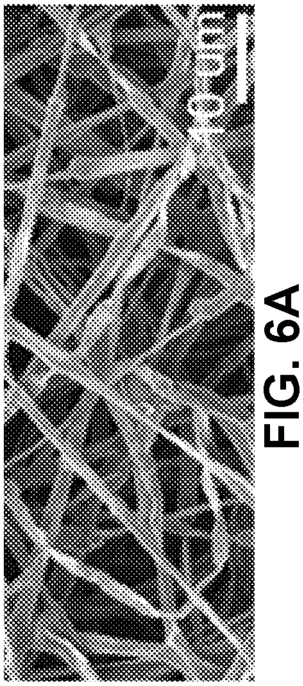
Figure 6C:
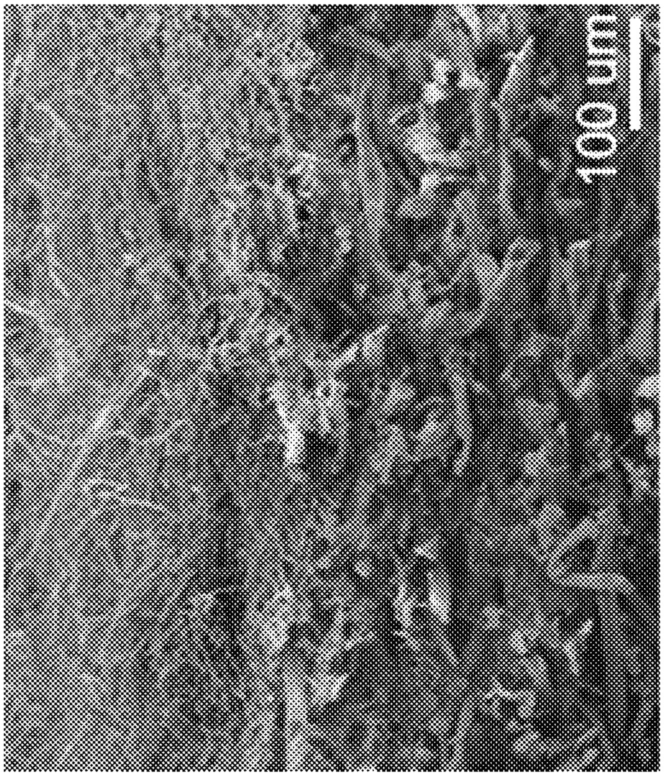

FIG. 6A-C illustrate an example of images of the mycelium mesh network. FIG. 6A illustrates a SEM (top panel) and confocal images (bottom panel) of mycelium fibers. From the topographical view, an intricate and extensive mesh-like network of mycelium fibers with diameters from ~500 nm to 4.0 μm, centering at 1.5 μm (Top panel of FIG. 6A) are present. This hierarchical porous structure with nano- and micro-scaled fibers that are randomly dispersed establishes a network with isotropic optical and mechanical functionalities. As depicted by the confocal microscopy images (bottom panel of FIG. 6A), along mycelium fibers, hydrophobin is distributed over the surface of a single fiber and aligned with the growth trajectory to create a superhydrophobic mesh. FIG. 6B illustrates a cross-section image of the biomulch with mycelium fiber entangled with cellulose fibers. The cross-sectional in FIG. 6B elucidates a dual-layered structure of the living biomulch: the upper layer is constituted by the porous mycelium network and the base comprises the cellulose fabric. The magnified SEM images of the cellulose matrix layer reveal fibers with diameters ranging from 20 μm to 60 μm, intricately intertwined and forming a supporting substrate for the proliferation and entanglement of the mycelium hyphae. FIG. 6C illustrates entanglement between mycelium and mycelium fibers. The fibers are interlapped, with knots forming at the junctions of interwoven fibers, where hydrogen bonds are established at those interface points, contributing to the overall mechanical properties.

Figure 7B:
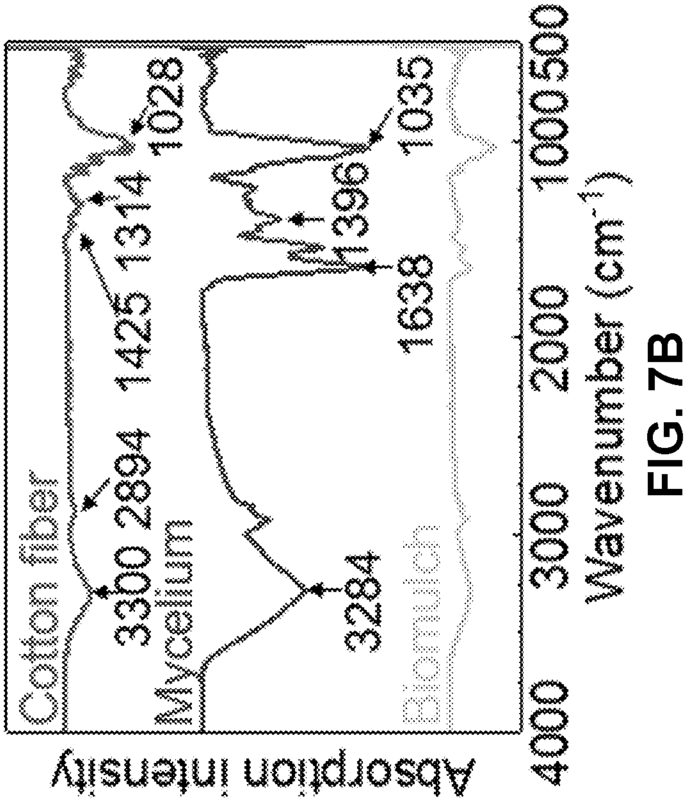
FIG. 7A-B illustrate charts showing tensile stress of living biomulch and cotton fabrics, and the molecular dynamic simulation of the interfacial energy of hydrogen bonding between molecular of mycelium and cellulose fibers.
Figure 7A:
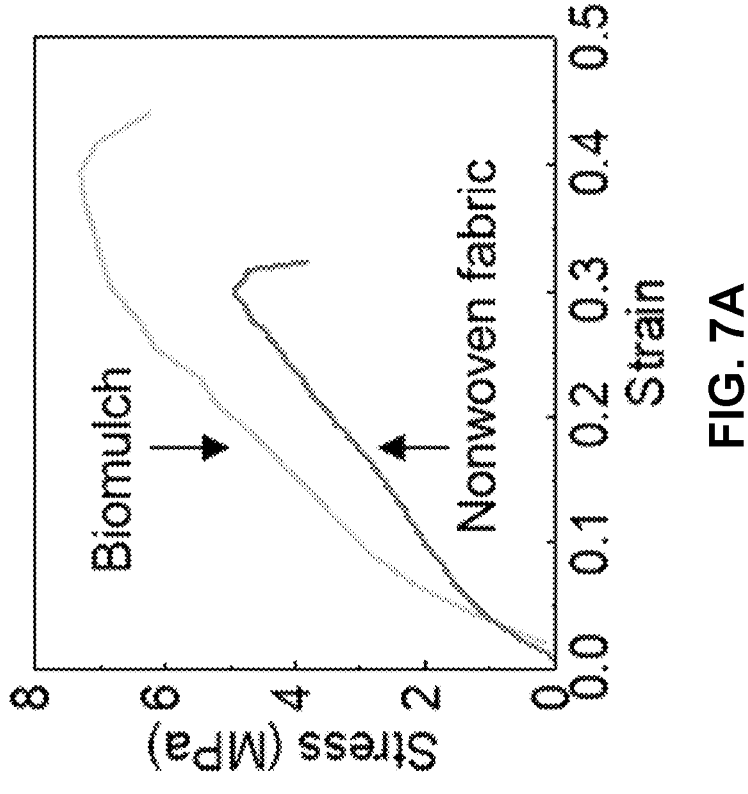

FIG. 7A-B illustrate charts showing tensile stress of living biomulch and cotton fabrics, and the molecular dynamic simulation of the interfacial energy of hydrogen bonding between molecular of mycelium and cellulose fibers. Due to the complex physical entanglement between mycelium and cellulose fibers, the living biomulch displays a higher tensile strength than cellulose fabric, indicated by a peak stress of 7.3 MPa than that of the cellulose fabric with a peak stress of 4.7 MPa. Other than the physical tangle enabling strong adhesion between mycelium and cellulose fibers, down to the atomic level, cellulose and mycelium have strong hydrogen bonding between their molecular chains due to the presence of hydroxyl groups (FIG. 7B). The model for non-equilibrium molecular dynamics in FIG. 7B analyzes the mechanical properties of cellulose and mycelium chains under tension loading in a horizontal direction. The cellulose and mycelium chains indicate a tensile strength of 20 MPa.

Apart from its mechanical strength, our living biomulch also displays a high thermal emittance for efficient heat dissipation.

Directional water transport of living biomulch: Mulch is a heat and water transport barrier or a bridge between crops and the ambient. Conventional mulch, including straw, bark chips, and synthetic plastic films, helps conserve water, suppress weeds, and prevent soil erosion. However, they cannot harvest atmospheric water for passive irrigation due to the lack of directional water transport. Therefore, engineering natural materials into mulch that can harvest atmospheric water to irrigate the soil to mitigate ever-increasing water scarcity should be prioritized. One possible way for passive irrigation is to create asymmetric wettability for directional water transport. Intriguingly, the mycelium fiber network facing the sky with hydrophobin proteins is superhydrophobic (contact angle, 138.6°), while the cellulose fabric facing the soil with abundant hydroxyl groups is hydrophilic (contact angle, 0°). This creates a Janus wettability, i.e., the top mycelium fibers repel water, while the cellulose fibers attract it, fostering a unidirectional flow from top to bottom.

When the superhydrophobic mycelium layer faces the top, the water droplet is transported to the bottom cellulose fabric layer within 30 seconds. However, when the hydrophilic layer faces the top, water droplets are repelled by the mycelium layer and contained within the cellulose fabric.

Figure 8:
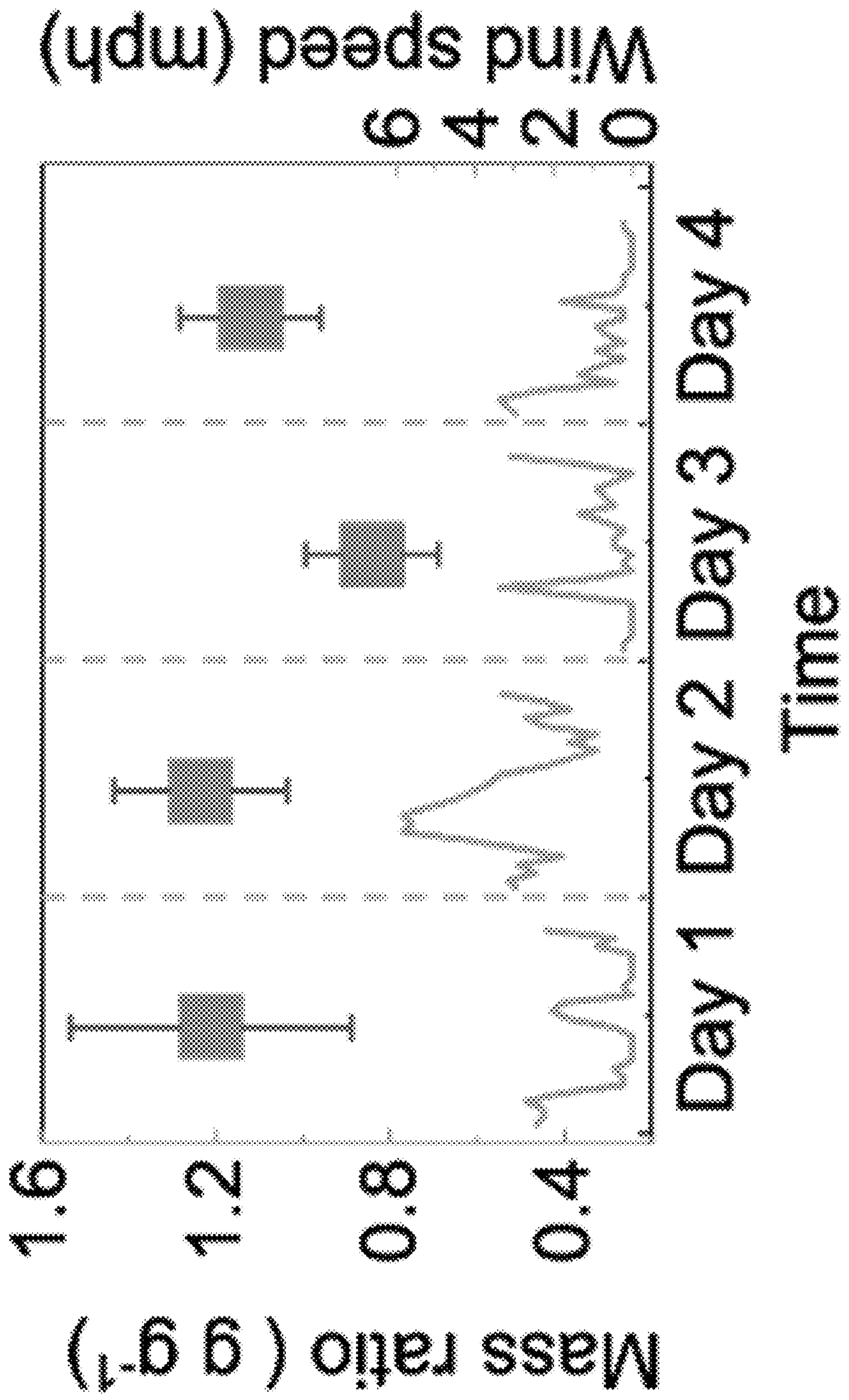
FIG. 8 illustrates the mass ratio of the biomulch and ambient windspeeds during a during a continuous 4-day field test of the water absorption performance.

Assisted by the unidirectional water transport of the living biomulch resulting from its Janus wettability, the condensed water droplets from the ambient by radiative cooling can be quickly absorbed and transported to the bottom soil, which mitigates water loss by minimizing evaporation even in conditions with significant wind presence. It thus enhances the efficiency of water harvesting from the air which is significant considering mulch are deployed in the open field. FIG. 8 illustrates the mass ratio of the biomulch and ambient windspeeds during a during a continuous 4-day field test of the water absorption performance. The results show a water absorption rate of 1.25 g g-1 on a night with light to moderate wind where the peak wind is around 6 mph.

Figure 9A:
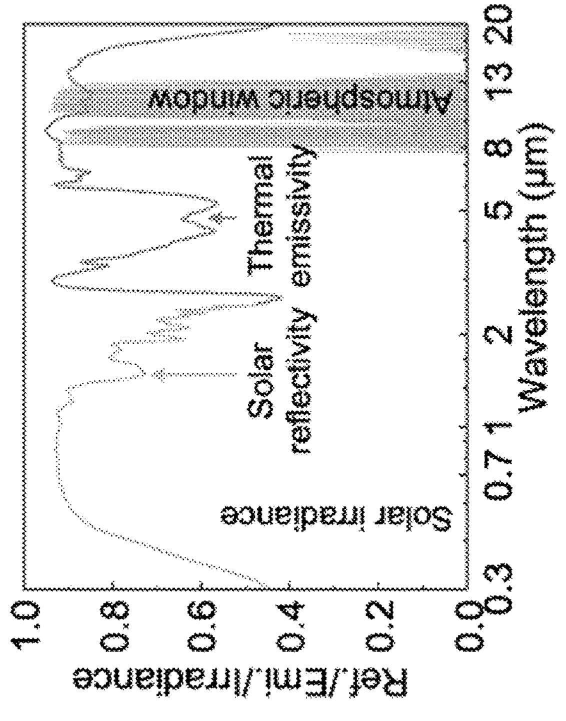
FIG. 9A-D illustrates charts showing optothermal performance of living biomulch.
Figure 9B:
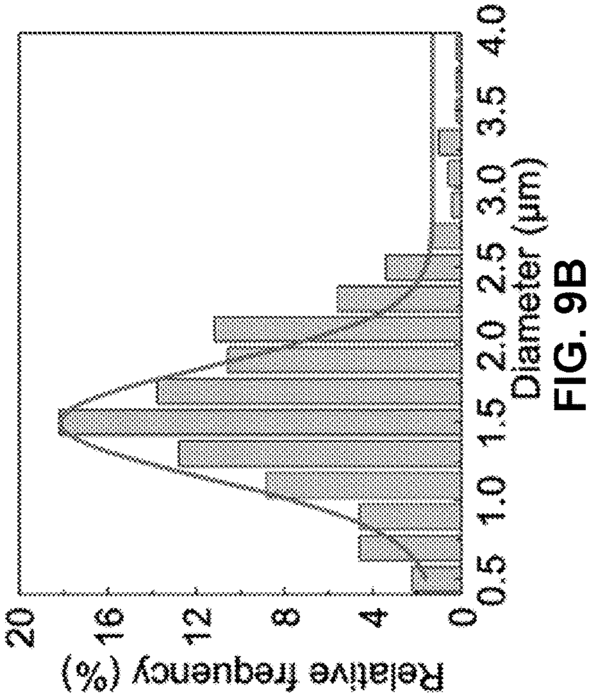
Figure 9C:
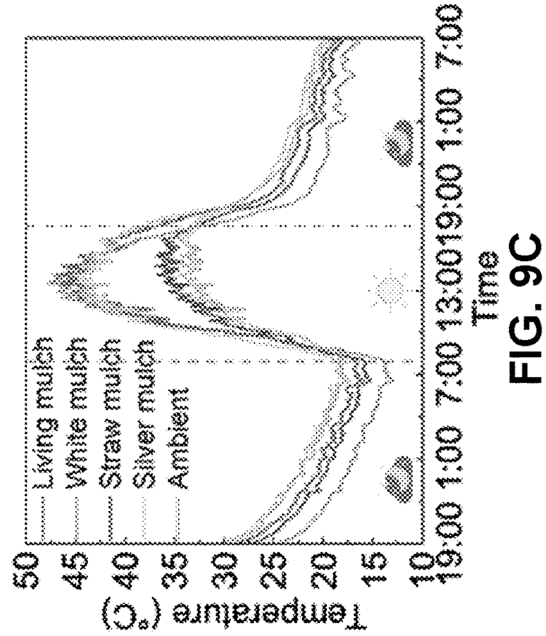

FIG. 9A-C illustrates charts showing optothermal performance of living biomulch.

Solar rejection and sunlight redirection: A notable feature of the living biomulch is the high solar reflectance for rejecting solar heating to alleviate soil heat stress. This cooling effect comes from the efficient backscattering of sunlight. Moreover, its diffused sunlight reflection also shapes the light distribution for the bottom canopy of crops. As illustrated in FIG. 9A, the living biomulch shows an overall solar reflectance of 0.9 over the solar wavelengths, which results from the hierarchical structure of mycelium networks (FIG. 9B) and cellulose fibers. Additionally, its high thermal emittance derived from strong molecular vibrations of —C═O—H chemical bonds in mycelium fibers promotes radiative heat dissipation, which can effectively mitigate soil heat stress. Diameters of mycelium fibers range from 500 nm to 4.0 μm, where these nanofibers can backscatter short-wavelength sunlight, such as UV and visible range while near-infrared sunlight is backscattered by those microfibers. This phenomenon is also illustrated by the scattering efficiency simulation of mycelium fibers as functions of their diameter and wavelengths. As shown by the location of the red region representing higher scattering efficiency, with the increasing fiber diameters, wavelengths expand to a longer range. To explore more about sunlight backscattering, cross-section electrical field distribution for 500 nm wavelength across a region of 60×60 μm was simulated. The scattering happens at the interface of mycelium fibers and air because of their refractive index, i.e., the refractive index of mycelium at 500 nm is around 1.4 while the air is 1. The mycelium arrangement in the inset of cross-section SEM images for mycelium fibers is identical to the bright region in the 2D plot of the electrical field. Compared with electric field distribution for other wavelengths, we can see that light scattering for longer wavelengths happens at mycelium fibers with larger diameters and longer wavelengths show a bigger penetration depth. Compared with that of the polished Al plate, the scattered laser area of the living biomulch is around 4 times bigger. Furthermore, this hierarchical structure also renders an angle-independent solar reflectance from 0 to 60 degrees, meaning that its diffused surface can make the sunlight distribution more uniformly under the lower canopy of crops. More redirected sunlight will enhance photosynthesis for more yield.

Figure 9D:
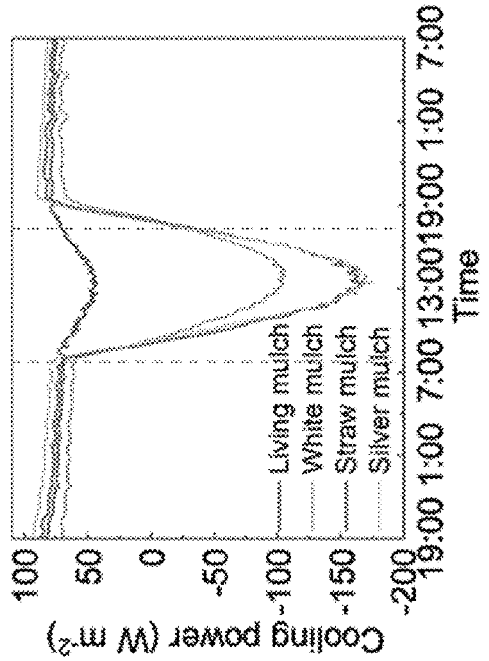

To quantify the optothermal performance of the living biomulch, we measure its temperature reduction compared with other three commercial products including white plastic, silver, and straw mulches. For the measurement under a clear sky, we employ a polyethylene (PE) film over the experimental chamber at a location of 1 cm above the samples. The PE film is broadly transparent over both solar and infrared wavelengths. The PE film also prevents the water absorption process of the living biomulch, therefore, the temperature drop is mainly introduced by its excellent passive cooling effect. We performed an outdoor experiment on Jun. 11, 2023, in West Lafayette, Indiana over 24 hours and the ambient temperature ranged from 17 to 32 degrees C. during this period. Referring to FIG. 9C, during the nighttime, the temperature reduction of the living biomulch stabilizes at around 5.6 degrees C. below the ambient, which is even below the dew point from 1 AM to 5 AM, verifying its water harvesting potential. The silver mulch shows a temperature fluctuating around the ambient due to its low thermal emittance, while the temperature of straw mulch is below the ambient since its high thermal emittance resulting from its components including cellulose and lignin as demonstrated in previous research. The white mulch demonstrates the lowest temperature during the nighttime due to its relatively low thickness, i.e., low thermal resistance compared with straw mulch with a thickness of 3 mm. Moreover, the white mulch also exhibits a high thermal emittance for efficient radiative cooling. During the daytime, the solar heating effect dominates the temperature response of these four mulches. The living mulch with both high solar reflectance of 0.9, high thermal emittance of 0.8, and relatively low thermal conductivity demonstrates the best thermal performance. The white mulch shows the highest temperature due to its low reflectance and low thermal resistance, and the temperature of the straw mulch is similar to that of the white mulch. Even though the solar reflectance of the silver mulch is high, its temperature rises to that of the straw mulch owing to its low thermal emittance and low thermal resistance. Based on a thermal model, the corresponding heat flux from the solar and ambient to the soil is illustrated in FIG. 9D, where positive values represent heat dissipation from the soil to the ambient, and negative values mean heat gain from the solar and the ambient. At noontime (indicated by the red row), the heat flux of silver and straw mulch peaks at around 160 W m-2, further validating the need for alleviating soil heating. The heat flux of the living biomulch (~30 W m-2) is only 12.5% around peak values of straw and silver mulch, correlated with a temperature fluctuating around the ambient temperature. These results demonstrate the optothermal property of the living biomulch outperforms these commercial products, elucidating the advantage of our enhanced solar rejection and thermal block.

A second action may be said to be “in response to” a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A mulch comprising:

a hydrophilic cellulose layer; and a hydrophobic top layer formed on the cellulose layer, wherein the cellulose layer and top layer together form a wettability gradient which facilitates directional water transport from the hydrophobic top layer to the hydrophilic cellulose layer, wherein a surface of the hydrophobic top layer is optically opaque, exhibits a solar reflectance of 85% to 98% in response to incident light in the 250-2500 nm wavelength range, wherein the mulch provides a mid-infrared emissivity of 0.85 to 0.97 in the 8-13 μm range, and wherein the solar reflectance and mid-infrared emissivity decrease underlying soil temperature by at least 2° C. compared to uncovered soil under equivalent solar conditions.

2. The much of claim 1, wherein the mulch is configured to capture atmospheric moisture, including dew and fog.

3. The much of claim 1, wherein the hydrophobic top layer is vapor-permeable and has open porosity configured to allow moisture transmission to the hydrophilic cellulose layer.

4. The mulch of claim 1, wherein the hydrophobic top layer comprises a hydrophobic coating, the hydrophobic coating comprising at one of polydimethylsiloxane (PDMS), silica ($SiO_2$), waxes, and alkylsilane compounds.

5. The mulch of claim 4, wherein the hydrophobic coating has a thickness between 5 μm and 50 μm.

6. The mulch of claim 1, wherein the hydrophobic top layer comprises a mycelium network grown on the cellulose layer.

7. The mulch of claim 6, wherein the mycelium network is 50-500 μm thick.

8. The mulch of claim 6, the mycelium network is porous and breathable, with an open pore structure that supports condensation and directional water delivery.

9. The mulch of claim 1, wherein the cellulose layer comprises randomly oriented cellulose fibers with diameters between 10 μm and 100 μm, with a bulk porosity of 30% to 90%.

10. The mulch of claim 1, wherein the total mulch thickness ranges from 0.5 mm to 2.5 mm.

11. The mulch of claim 1, wherein the hydrophobic top layer is air-permeable due to its porous structure, with an air permeability in the range of 1 to 50 Darcy, allowing gas exchange between the soil and atmosphere while maintaining surface coverage and environmental protection.

12. The mulch of claim 1, wherein the structure promotes radiative cooling by reflecting solar radiation and emitting thermal infrared radiation.

13. The mulch of claim 1, wherein the cellulose layer is biodegradable and derived from renewable biomass including corn stalks, wheat straw, or sugarcane bagasse.

14. A method of fabricating a mulch comprising:

providing a cellulose fabric;

forming a hydrophobic surface on one side of the cellulose fabric wherein the surface is optically opaque, exhibits a solar reflectance of 85% to 98% in response to incident light the 250-2500 nm wavelength range, wherein the cellulose fabric and hydrophobic surface provide a vertical wettability gradient enabling unidirectional water transport and passive thermal regulation.

15. The method of claim 14, wherein forming the hydrophobic surface further comprises applying a hydrophobic coating to the cellulose fabric.

16. The method of claim 15, wherein the hydrophobic coating comprises at one of polydimethylsiloxane (PDMS), silica ($SiO_2$), waxes, and alkylsilane compounds.

17. The method of claim 15, wherein hydrophobic coating is vapor-permeable and has open porosity configured to allow moisture transmission to the cellulose fabric.

18. The method of claim 15, wherein the applied hydrophobic coating has a thickness between 5 μm and 50 μm.

19. The method of claim 14, wherein forming the hydrophobic surface further comprises growing a mycelium network on the cellulose fabric.

20. The method of claim 19, wherein the mycelium network is 50-500 μm thick.

21. The method of claim 14, wherein the hydrophobic surface is breathable and maintains an air permeability of 1 to 50 Darcy, while remaining impermeable to liquid water on the hydrophobic surface.

* * * * *